United States Patent [19]

Shimizu et al.

[11] Patent Number: 5,581,377

[45] Date of Patent: Dec. 3, 1996

[54] IMAGE PROCESSING METHOD AND APPARATUS FOR SYNTHESIZING A PLURALITY OF IMAGES BASED ON DENSITY VALUES

[75] Inventors: Hideaki Shimizu, Yokohama; Hiroyuki Yaguchi, Inagi; Yasuhiro Takiyama, Kawasaki; Tadashi Takahashi, Yokohama, all of Japan

[73] Assignee: Canon Kabushiki Kaisha, Tokyo, Japan

[21] Appl. No.: 381,406

[22] Filed: Jan. 31, 1995

[30] Foreign Application Priority Data

Feb. 1, 1994 [JP] Japan .................. 6-010462

[51] Int. Cl.⁶ .................................. H04N 1/56
[52] U.S. Cl. .................. 358/540; 358/450; 358/538; 382/284
[58] Field of Search .................. 358/500, 518, 358/538, 539, 540, 450, 501; 382/284; 395/135, 164; H04N 1/56

[56] References Cited

U.S. PATENT DOCUMENTS

| | | | |
|---|---|---|---|
| 5,034,806 | 7/1991 | Ikeda et al. | 358/540 |
| 5,165,071 | 11/1992 | Moriya et al. | 358/406 |
| 5,363,454 | 11/1994 | Udagawa et al. | 358/501 |
| 5,465,163 | 11/1995 | Yoshihara et al. | 358/450 |

*Primary Examiner*—Kim Vu
*Attorney, Agent, or Firm*—Fitzpatrick, Cella, Harper & Scinto

[57] ABSTRACT

High density portions of images are preferentially expressed when a plurality of images constructed by multivalue image data are synthesized. A plurality of different images are synthesized, wherein overlapped multivalue image data of pixels among multivalue image data constructing the images are compared and the multivalue image data of which one of the images should be preferentially used is determined in accordance with the comparison result.

12 Claims, 5 Drawing Sheets

IMAGE PROCESSING METHOD AND APPARATUS FOR SYNTHESIZING A PLURALITY OF IMAGES BASED ON DENSITY VALUES

BACKGROUND OF THE INVENTION

1. Field of the Invention

The present invention relates to an image processing method and apparatus for synthesizing a plurality of different images.

2. Related Background Art

Hitherto, as a synthesis of digital images, for example, in a synthesis of a first image of plural colors and a second image of plural colors, namely, a synthesis of two images of full colors, a method of obtaining a synthesized image by calculating color components which construct both of the images is known. For instance, when respective color components assume R1, G1, B1, R2, G2, and B2, color components (R, G, B) of the synthesized image can be shown by values such as R=(R1+R2)/2, G=(G1+G2)/2, and B=(B1+B2)/2.

According to such a method, however, for example, when a white portion of an image and a normal image are synthesized, a synthesized image of a faint color is obtained. A synthesized image in which densities of dense portions of both images are reproduced as they are, like a multiple copy of an analog copy, cannot be formed.

SUMMARY OF THE INVENTION

It is, therefore, an object of the invention to provide an image processing method and apparatus which can eliminate the drawbacks of the conventional technique and which can preferably express the high density portions of images when a plurality of images which are constructed by multivalue image data are synthesized.

It is another object of the invention to provide an image processing method and apparatus which can synthesize and output a color image at a high speed.

According to the invention, the above objects are accomplished by an image processing method of synthesizing a plurality of different images, wherein overlapped multivalue image data of pixels among multivalue image data constructing respective images are compared and the multivalue image data of which one of the images should be preferentially used is determined in accordance with the comparison result.

There is also provided an image processing method in an image processing apparatus for synthesizing a plurality of different images, including calculating means for calculating to form data for comparison from color components constructing the image, and comparing means for comparing the comparison data obtained by the calculating means every pixel, wherein either one of the images is selectively outputted for every pixel in accordance with the comparison result by the comparing means.

There is also provided an image processing method including inputting means for inputting a plurality of multivalue color component signals, and synthesizing means for synthesizing first and second different images by using the multivalue color component signals concerning the first and second images, wherein the synthesizing means selectively outputs the multivalue color component signals regarding the first or second image for every pixel.

The above and other objects and features of the present invention will become apparent from the following detailed description and the appended claims with reference to the accompanying drawings.

DETAILED DESCRIPTION OF THE PREFERRED EMBODIMENTS

Embodiment 1

Figure 1:
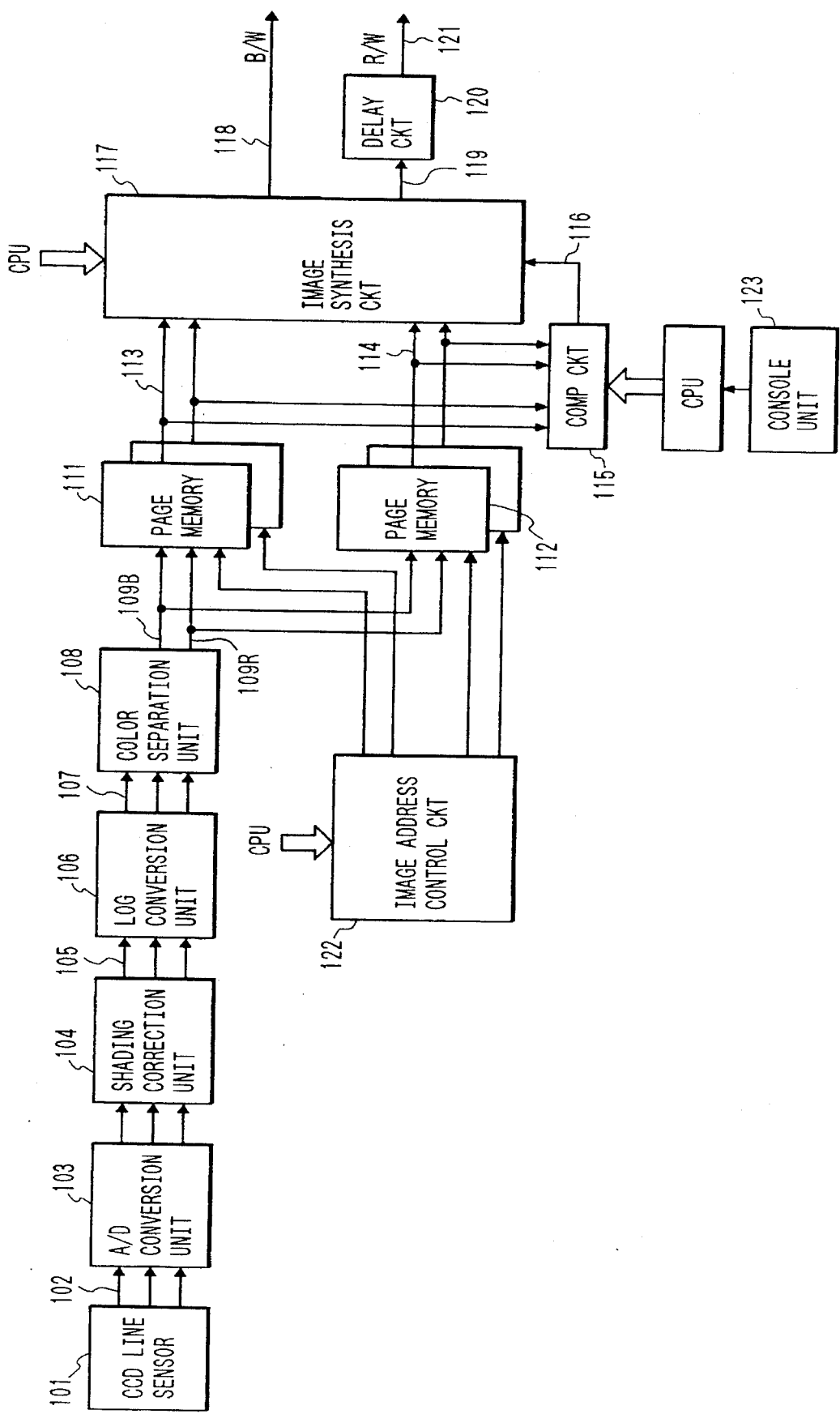
FIG. 1 is a block diagram of the first embodiment of the invention.
Figure 2:
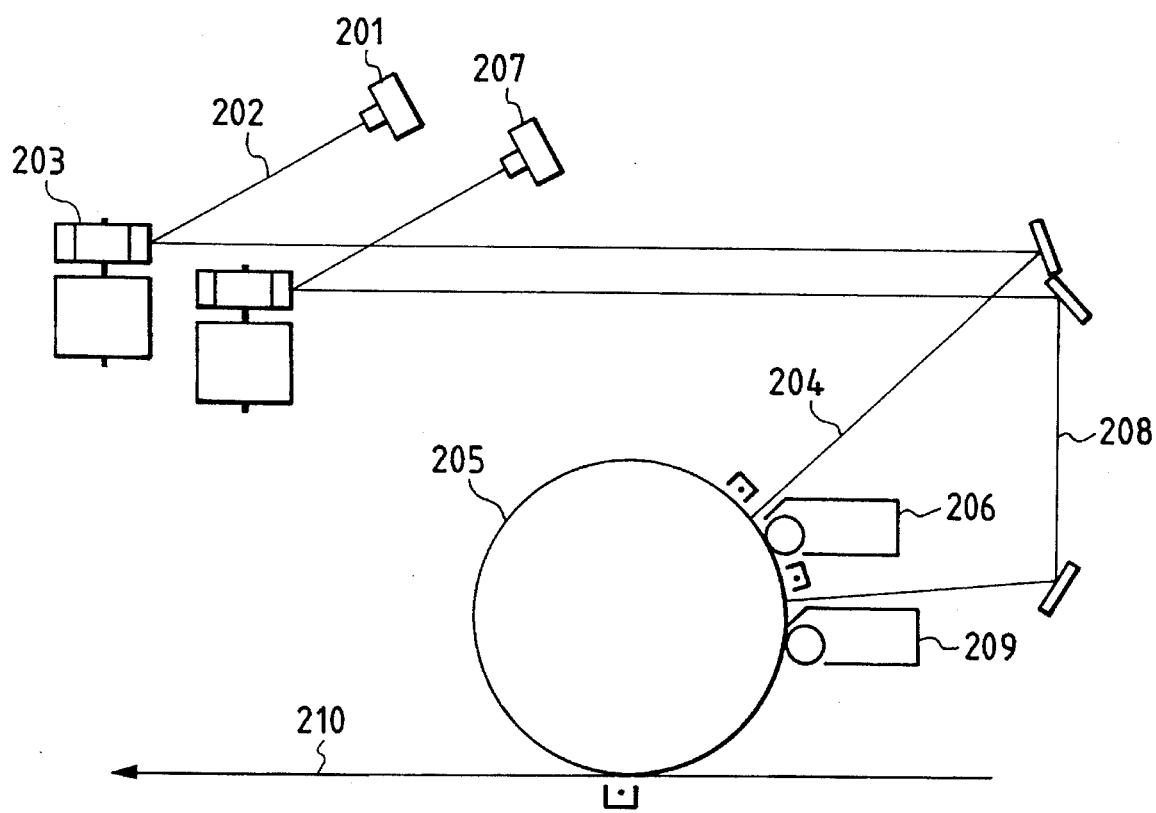
FIG. 2 is a diagram of an image forming unit.

The embodiment will be first described in detail by referring to FIG. 1. An image is read out as analog image data 102 of RGB by a CCD line sensor 101 from an original put on an original supporting base plate. After that, the data is analog/digital converted by an A/D conversion unit 103. A shading correction to correct an unevenness of sensor outputs is performed by a shading correction unit 104 in a state of digital signals of R, G, and B each consisting eight bits. RGB luminance signals 105 are converted to CMY density signals 107 by a Log conversion unit 106 and are separated to black image data (B/W) 109B of multivalues and red image data (R/W) 109R of multivalues by a color separation unit 108. In the case where the user of the apparatus doesn't preliminarily select an image synthesis mode by using a console unit 123, in this instance, a CPU bypasses an image synthesis circuit 117 and multivalue image data 118 and 119 passes through the circuit 117. The black image data 118 is scanned by a laser beam 202 from a laser driver 204 for black image by a polygon mirror 203 and an image is written on a photosensitive drum 205 as shown in FIG. 2. A black image is formed by a black developing device 206. As shown in FIG. 2, since an image of the red image data 119 is written on the photosensitive drum 205 by a laser beam 208 for the red image later than a laser beam 204 for the black image, the positions of the black and red images are made to coincide by delaying the black image data by a delay circuit 120 (FIG. 1). The red image is developed on the black image by a red developing device 209 (FIG. 2) and the resultant image is transferred onto a paper 210 as a red/black multiplexed image.

Figure 3:
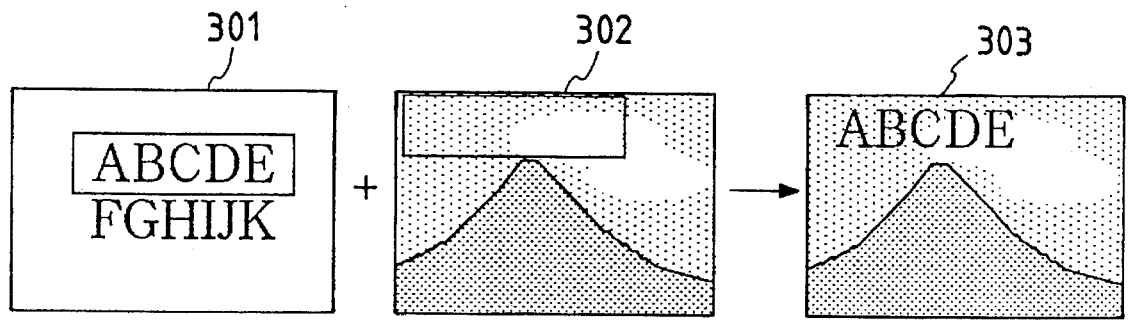
FIG. 3 is a diagram which is useful for describing an image synthesis according to the invention.

In the case where the image synthesis mode has been preliminarily selected by the user of the apparatus by using the console unit 123, the first image among a plurality of different full-color images to be synthesized is read out by the CCD line sensor 101 and is separated into the black image data and red image data by the color separation unit 108 and the data is written to a page memory 111. Similarly, the second image is read out by the CCD line sensor 101 and is written to a page memory 112. As shown in FIG. 3, areas to synthesize are designated to two originals 301 and 302 before the images are fetched. In this case, the original 301 is set to an image to be synthesized and the original 302 is set to a base image.

Figure 5:
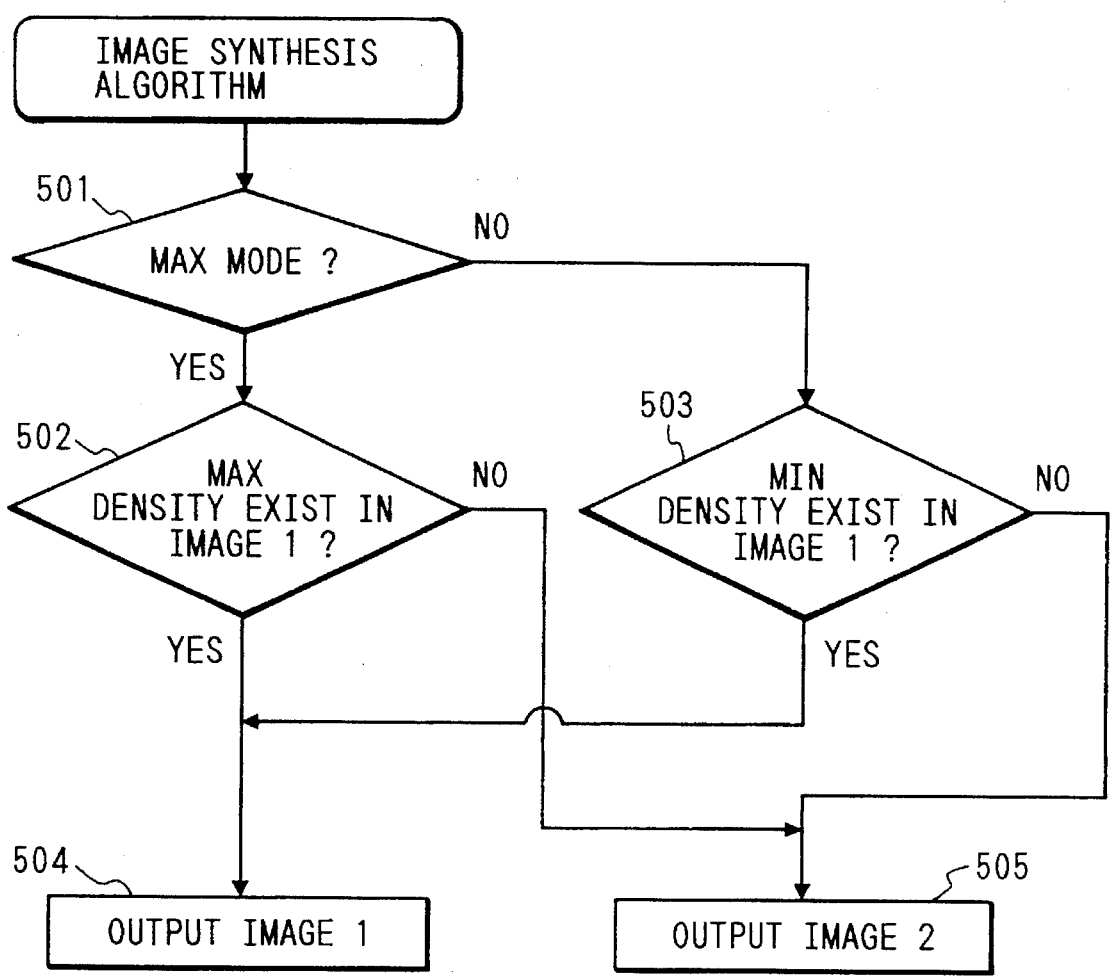
FIG. 5 is a flowchart of a processing procedure of the first embodiment of the invention.

The control which is executed upon synthesis will now be described in detail. First, the base image 302 is read out from the page memory 111 by an image address control circuit 122 by a raster method and image transfer is performed. Further, under the management of an image address control circuit 122, when an address in the page memory 111 reaches the synthesis area of the base image set by the CPU, the designated area for synthesis is simultaneously read out from the page memory 112. That is, images of the areas surrounded by rectangles in the originals (301, 302) in FIG. 3 are synchronized and are read out in parallel. The data magnifications of all color components (K113, R113, K114, R114) of the two images are compared for every pixel by a comparison circuit 115. The black image from the page memory 111 is set to K113, the red image from the page memory 111 is set to R113, the black image from the page memory 112 is set to K114, and the red image from the page memory 112 is set to R114. For example, now assuming that $$K113=189, R113=26, K114=16, R114=129 \qquad (1),$$

the maximum data among the plurality of color component data of the images in this case is K113 and the minimum data is K114. The information of the maximum and minimum data is sent to the image synthesis circuit 117 as a comparison signal 116 of two bits. In the image synthesis circuit 117, either one of data 113 of the first image (image 1) or data 114 of the second image (image 2) is selected by the comparison signal 116. In FIG. 5, in the case where the user has preliminarily selected an MAX density mode (step 501), when the next MAX density exists in the first image in step 502, the first image is outputted (504). When the MAX density does not exist in the first image in step 502, the second image is outputted (505). In case of (1) mentioned above, the data of the image 1, namely, the value of 189 is outputted for the black image data 118 and the value of 26 is outputted for the red image data 119 as a synthesized image. Similarly, in the case where the user has preliminarily selected the MIN density mode (501), when the next MIN density exists in the first image, the first image is outputted (504). When the MIN density does not exist in the first image, the second image is outputted (505). In case of (1) mentioned above, the data of the image 2, namely, the value of 16 is outputted for the black image data 118 and the value of 129 is outputted for the red image data 119 as a synthesized image.

By the above processes, when the MAX density mode is selected, the character image in the original 301 is synthesized with the photograph image of the original 302, so that a synthesis image 303 can be outputted as shown in FIG. 3.

Figure 4:
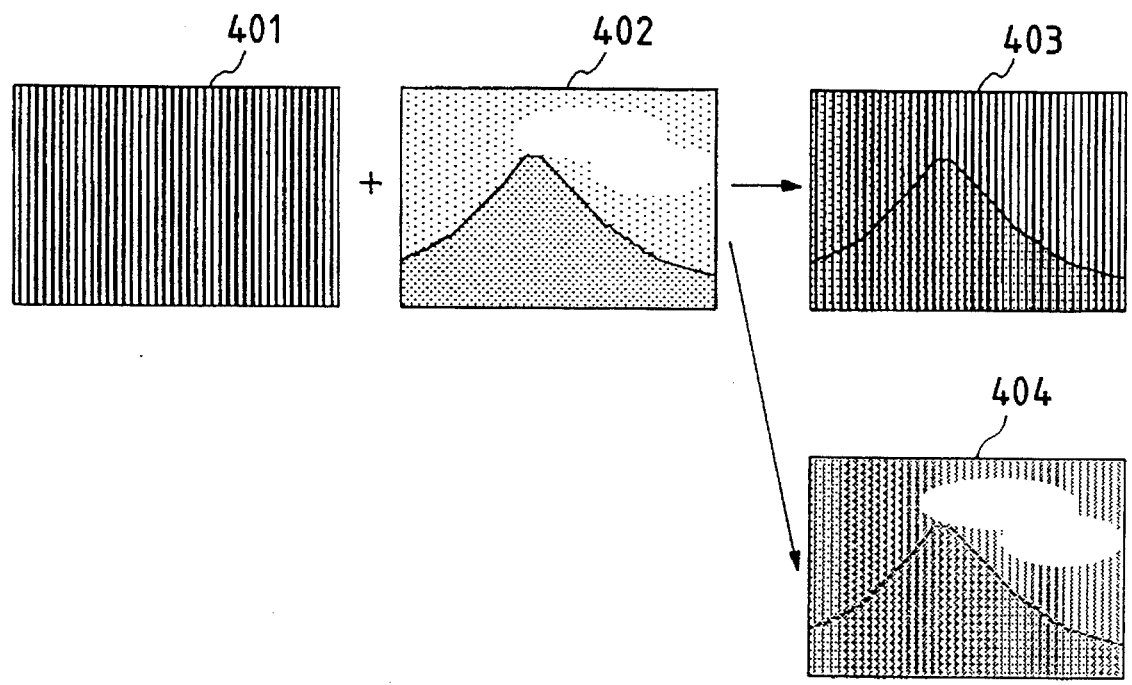
FIG. 4 is a diagram which is useful for describing the image synthesis according to the invention.

FIG. 4 shows a meshing/texture process of an image using such a synthesizing method. For example, a multivalue image pattern of a monochromatic black image or the like has preliminarily been read and stored into the page memory 111 as an image 1 of an original 401. Subsequently, an image 2 of an original 402 is read and the process for synthesizing the image 2 to the image 1 is executed in a manner similar to the above-mentioned case. In this case, a comparison is performed among three color components of only K113 of the black image from the page memory 111 and K114 of the black image and R114 of the red image from the page memory 112. When the MAX density mode is selected, a synthesis image 403 is outputted. When the MIN density mode is selected, a synthesis image 404 is outputted. The MAX and MIN density modes in the comparison circuit 115 are selected by the CPU.

Although an example of a two-color copy has been described in the embodiment, in a case of three colors of Y (yellow), M (magenta), and C (cyan) or four colors of Y, M, C, and Bk (black), full-color images can also be synthesized by similar processes.

According to the foregoing embodiment, when a plurality of colors are copied, images are not area sequentially formed but are formed together by delaying a certain color component for the other color components, so that an image can be formed at a high speed.

Embodiment 2

Figure 6:
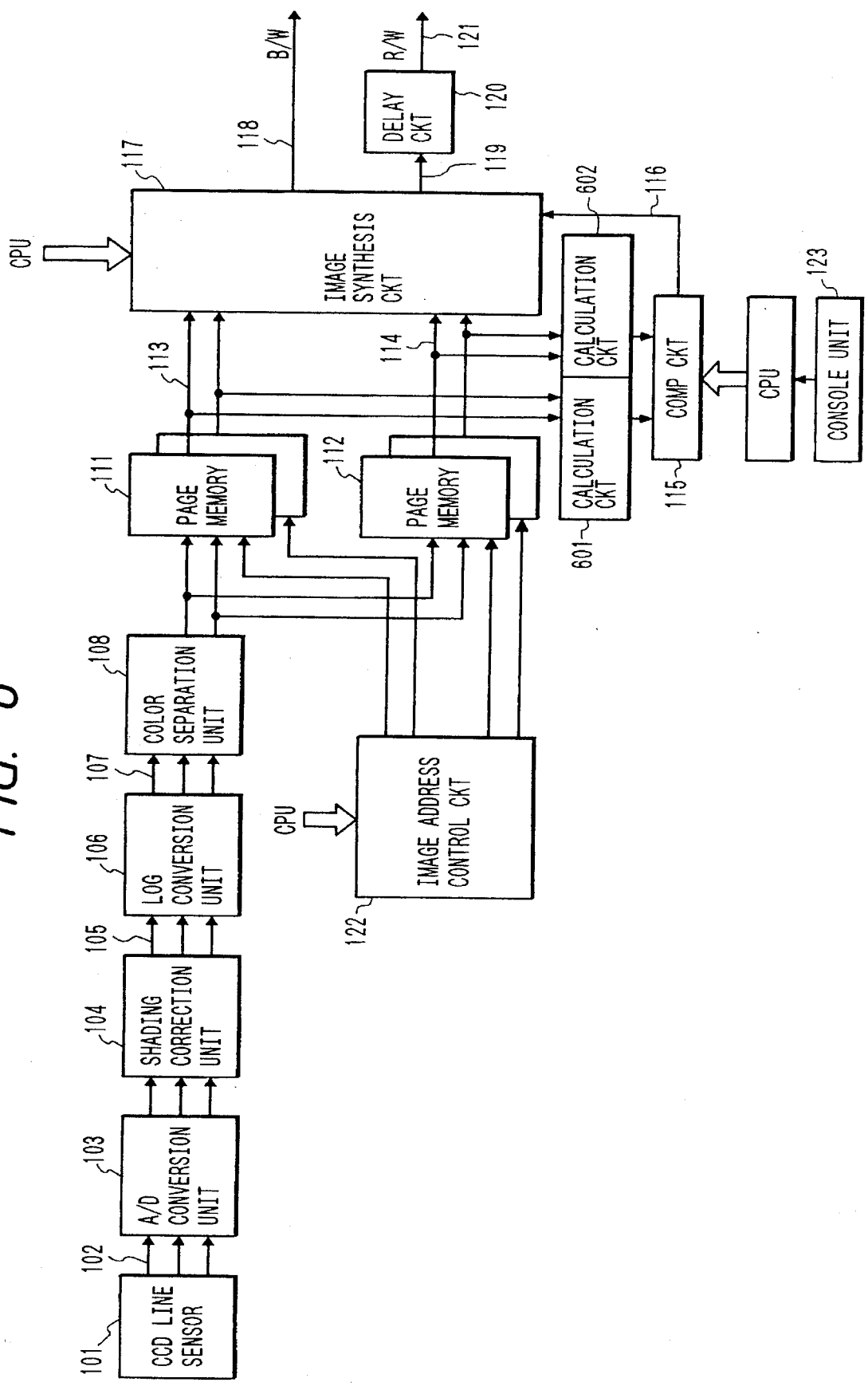
FIG. 6 is a block diagram of the second embodiment of the invention.

The second embodiment of the invention will now be described in detail with reference to FIG. 6, hereinbelow.

The ordinary copying operation is executed in a manner similar to the first embodiment. When the images are synthesized, the first one of the two images to be synthesized is read out and is separated to the black image data and red image data by the color separation unit 108 and is written into the page memory 111. Similarly, the second image is read out and written into the page memory 112. Before fetching the images, the areas for synthesizing the two originals 301 and 302 are designated as shown in FIG. 3. In this case, the original 301 is set as the image to be synthesized and the original 302 is set as the base image.

A control which is executed upon synthesis will now be described in detail. First, the base image 302 is read out from the page memory 111 by the image address control circuit 122 and is transferred by the raster method. Further, under management of the image address control circuit 122, when the address in the page memory 111 reaches the synthesis area of the base image set by the CPU, the designated area for synthesis is simultaneously read out from the page memory 112. That is, images of the areas surrounded by the rectangles in the originals (301, 302) in FIG. 3 are read out in parallel. The data magnifications of all of the color components (K113, R113, K114, R114) of the two images are compared for every pixel by the comparison circuit 115. The black image from the page memory 111 is set to K113, the red image from the page memory 111 is set to R113, the black image from the page memory 112 is set to K114, and the red image from the page memory 112 is set to R114. The following arithmetic operations are executed by calculation circuits 601 and 602.

*Comparison data of the image 1=constant A×K113+constant B×R113*

*Comparison data of the image 2=constant A×K114+constant B×R114*

The user of the apparatus can arbitrarily set constants A and B at the console unit 123 and there is always a relation of (constant A+constant B=1). The data is compared by the comparison signal 116 and the information indicating which one of the image signals is larger is sent to the image synthesis circuit 117. In the image synthesis circuit 117, the data 113 of the image 1 or the data 114 of the image 2 is selected by the comparison signal 116.

For instance, in those data, it is now assumed that K113= 189, R113=26, K114=16, and R114=129. When the constant A is equal to 0.8 and the constant B is equal to 0.2,

*Comparison data of the image 1=0.8×189+0.2×26=156.4*

*Comparison data of the image 2=0.8×16+0.2×129=38.6*

Therefore, the comparison data of the image 1 is larger. The image data 113 of the image 1 in which the comparison data of the image 1 is larger is merely selected by the image synthesis circuit 117, the value of the synthetic output black data 118 is equal to 189, and the value of the synthetic output red data 119 is equal to 26.

In the foregoing embodiment, by using a few methods as conditions to synthesize an image of plural colors and another image of plural colors, an ideal synthetic image to be obtained by the user can be formed.

Such methods are as follows. When it is assumed that a plurality of color components are set to A and B and the output image data after synthesis in two color images are set to (A, B), such as A1, B1, A2, and B2, (i) When max(A1,B1,A2,B2)=A1 or B1, A=A1, B=B1
In the other cases, A=A2, B=B2

(ii) By constants (a) and (b),
when max(a×A1+b×B1, a×A2+b×B2)=a×A1+b×B1,
A=A1, B=B1
In the other cases,
A=A2, B=B2

Although those conditions have been mentioned with respect to the synthesis in case of the MAX density mode as an example, when the MIN density mode is selected, it is sufficient to change "max" to "min".

According to the embodiment as described above, even in a digital copy, a multiple synthesis using a multi-color image similar to an analog copy can be realized. The multiple synthesized image using the multi-color image which is peculiar to the digital copy can be provided.

Although the comparison and synthesis have been executed on the basis of the image formation signals of black and red in the foregoing examples, it is also possible to perform a similar comparing process to the inputted multi-value color component signals of R, G, and B and to decide a preferential image.

The input color component signals are not limited to (R, G, B) but other color component signals such as (Y, M, C, K) or (L*, a*, b*) or the like can be also used.

The image forming apparatus is not limited to the foregoing examples but another recording method, for example, an ink jet method or the like can also be used.

Although both of the base image and the image to be synthesized have been stored into the page memory in the foregoing embodiments, it is also possible to store either one of the images into the memory and to read out the stored image from the memory synchronously with the reading operation of the other image and to synthesize those images. By using such a method, the capacity of the page memory can be reduced.

Although a predetermined comparison has been performed and the plurality of color component data of the first or second image have been selected together on a pixel unit basis in accordance with the comparison result in the above-mentioned embodiments, it is also possible to compare every color component and to select the first or second image every color component on a pixel unit basis.

As mentioned above, according to the invention, when a plurality of images which are constructed by the multivalue image data are synthesized, the high density portions of both images can be preferably expressed.

The color images can be synthesized and outputted at a high speed.

The present invention is not limited to the foregoing embodiments but many modifications and variations are possible within the spirit and scope of the appended claims of the invention.

What is claimed is:

1. An image processing method comprising:
   a step of generating first multivalue image data representing a first image;
   a step of generating second multivalue image data representing a second image; and
   a synthesizing step of synthesizing the first multivalue image data and the second multivalue image data so that the first image and the second image overlap each other,
   wherein said synthesizing step includes,
      a comparing step of comparing a value corresponding to the first multivalue image data and a value corresponding to the second multivalue image data at a same pixel position, and
      a selecting step of selecting one of the first multivalue image data and the second multivalue image data, on a pixel unit basis, in accordance with a comparison result of said comparing step.

2. A method according to claim 1, wherein the first and second multivalue image data consists of a plurality of color components for each pixel and a maximum color component of each of the fist and second multivalue image data are preferentially used in said comparing step.

3. A method according to claim 1, wherein the first and second multivalue image data consisting of a plurality of color components for each pixel and a minimum color component of each of the first and second multivalue image data are preferentially used in said comparing step.

4. An image processing apparatus comprising:
   first generating means for generating first multivalue image data representing a first image;
   second generating means for generating second multivalue image data representing a second image; and
   synthesizing means for synthesizing the first multivalue image data and the second multivalue image data so that the first image and the second image overlap each other,
   wherein said synthesizing means includes,
      comparing means for comparing value corresponding to the first multivalue image data and a value corresponding to the second multivalue image data at a same pixel position, and
      selecting means for selecting one of the first multivalue image data and the second multivalue image data, on a pixel unit basis, in accordance with a comparison result of said comparing means.

5. An apparatus according to claim 4, wherein the first and second multivalue image data consisting of a plurality of color components for each pixel and a maximum color component of each of the first and second multivalue image data are preferentially used in said comparing means.

6. A method according to claim 4, wherein the first and second multivalue image data consisting of a plurality of color components for each pixel and a minimum color component of each of the first and second multivalue image data are preferentially used in said comparing means.

7. An image processing apparatus comprising:
   inputting means for inputting first color image data representing a first color image and second color image data representing a second color image; and
   synthesizing means for synthesizing the first color image data and the second color image data so that the first color image and the second color image overlap each other, wherein said synthesizing means includes, comparing means for comparing a value corresponding to the first color image data and a value corresponding to the second color image data at a same position, and selecting means for selecting one of the first color image data and the second color image data, on a pixel unit basis, in accordance with a comparison result of said comparing means.

8. An apparatus according to claim 7, wherein said inputting means is an image reading apparatus constructed by photoelectric converting means for generating a plurality of color component data.

9. An apparatus according to claim 7, further comprising extracting means for extracting twin color data from the color component data.

10. An apparatus according to claim 7, further comprising image forming means for forming a color image in accordance with the color image data synthesized by said synthesizing means.

11. An apparatus according to claim 10, wherein said image forming means forms an image of a plurality of color components in parallel.

12. An image processing method comprising:

an inputting step of inputting first color image data representing a first color image and second color image data representing a second color image; and a synthesizing step of synthesizing the first color image data and the second color image data so that the first color image and the second color image overlap each other, wherein said synthesizing step includes, a comparing step of comparing a value corresponding to the first color image data and a value corresponding to the second color image data at a same position, and a selecting step of selecting one of the first color image data and the second color image data, on a pixel unit basis, in accordance with a comparison result of said comparing step.

* * * * *

UNITED STATES PATENT AND TRADEMARK OFFICE
CERTIFICATE OF CORRECTION

PATENT NO. : 5,581,377
DATED : December 3, 1996
INVENTOR(S) : HIDEAKI SHIMIZU, ET AL.

It is certified that error appears in the above-identified patent and that said Letters Patent is hereby corrected as shown below:

ON THE TITLE PAGE

At [75] "Inagi;" should read --Tokyo;--.

COLUMN 2

Line 33, "consisting" should read --comprising--.
    Line 35, "Log" should read --log--.

COLUMN 3

Line 7, delete "the".
    Line 35, "In case" should read --In the case--.
    Line 43, "In case" should read --In the case--.

COLUMN 4

Line 55, "comparison" should read --comparison circuit 115, and the comparison--.

COLUMN 5

Line 57, "image every" should read --image for every--.

UNITED STATES PATENT AND TRADEMARK OFFICE
CERTIFICATE OF CORRECTION

PATENT NO. : 5,581,377
DATED : December 3, 1996
INVENTOR(S) : HIDEAKI SHIMIZU, ET AL.

It is certified that error appears in the above-identified patent and that said Letters Patent is hereby corrected as shown below:

<u>COLUMN 6</u>

Line 22, "consists" should read --consist--.
  Line 24, "fist" should read --first--.

Signed and Sealed this

Thirteenth Day of May, 1997

*Attest:*

BRUCE LEHMAN

*Attesting Officer*  *Commissioner of Patents and Trademarks*